United States Patent
Abu-Dayya

Patent Number: 5,838,742
Date of Patent: Nov. 17, 1998

[54] DIVERSITY PATH CO-CHANNEL INTERFERENCE REDUCTION

[75] Inventor: Adnan Abu-Dayya, Ottawa, Canada

[73] Assignee: Northern Telecom Limited, Montreal, Canada

[21] Appl. No.: 730,828

[22] Filed: Oct. 17, 1996

[30] Foreign Application Priority Data

Jul. 10, 1996 [CA] Canada ................................... 2180924

[51] Int. Cl.[6] ................................ H04B 7/10; H04L 1/02
[52] U.S. Cl. ............................................ 375/347; 375/348
[58] Field of Search .................................... 375/347, 348, 375/346; 455/101, 137

[56] References Cited

U.S. PATENT DOCUMENTS

| | | | |
|---|---|---|---|
| 3,633,107 | 1/1972 | Brady | 325/305 |
| 3,879,664 | 4/1975 | Monsen | 325/303 |
| 4,850,037 | 7/1989 | Bochmann | 455/276 |
| 5,031,193 | 7/1991 | Atkinson et al. | 375/13 |
| 5,233,626 | 8/1993 | Ames | 375/1 |
| 5,319,677 | 6/1994 | Kim | 375/100 |
| 5,339,334 | 8/1994 | Baghdady | 375/100 |
| 5,349,609 | 9/1994 | Tsujimoto | 375/100 |

FOREIGN PATENT DOCUMENTS

| | | |
|---|---|---|
| 0 430 481 A | 6/1991 | European Pat. Off. . |
| 0 594 551 A | 4/1994 | European Pat. Off. . |
| WO 9319526 | 9/1993 | WIPO . |

OTHER PUBLICATIONS

"Evaluation of Diversity Schemes in TDMA Digital Mobile Radio", R.D'Avella et al., Communications: Connecting the Future, San Diego Dec.2–5, 1990,Institute of Electrical and Electronics Engineers, vol. 1 of 3, Dec. 2, 1990,pp.490–494.

*Primary Examiner*—Stephen Chin
*Assistant Examiner*—Mohammad Ghayour
*Attorney, Agent, or Firm*—R. John Haley

[57] ABSTRACT

Diversity path signals, each comprising time division multiplexed symbols in a time slot including known symbols, are combined with respective weights to reduce co-channel interference. Initial weights are determined, using a window on the known symbols, to optimize signal to interference plus noise ratio. These weights are used to determine symbols adjacent to the window, and the window is changed to include determined symbols and the weights redetermined. This process is repeated with the window being moved progressively, preferably with successive positions overlapping, throughout the time slot. The initially known symbols can comprise synchronization symbols and/or CDVCC (coded digital verification color code) symbols. Desirably, both can be used with respective windows being moved in opposite directions through symbols between them to provide two results for each such symbol, the better one of which is selected in dependence upon a monitoring of possibly averaged errors for the symbols.

27 Claims, 4 Drawing Sheets

DIVERSITY PATH CO-CHANNEL INTERFERENCE REDUCTION

This invention relates to combining diversity path signals comprising time division multiplexed symbols to reduce co-channel interference. The invention is particularly applicable to TDMA (Time Division Multiple Access) cellular radio or wireless communications systems, including GSM (Global System for Mobile Communications).

BACKGROUND OF THE INVENTION

Co-channel interference (CCI) is constituted by one or more interfering signals within the frequency band of a desired signal in a communications system, and is a key factor that limits the frequency reuse capacity of cellular communications systems. The CCI can not be removed by conventional filtering techniques, because it falls within the bandwidth of the desired signal, so that it has been necessary in cellular communications systems to provide a relatively high ratio of the desired signal strength to the strength of potentially interfering signals in order to maintain effective communications. However, with decreasing cell sizes and increasing frequency re-use in cellular communications systems being necessary to meet increasing capacity requirements, CCI is increasingly important.

It is known to use a space-diversity receiver in order to enhance the reception of a desired signal and reduce the effects of CCI. In such a receiver, spaced antennas are provided for producing respective received signals, a weighted combination of which is provided as an optimum received signal for demodulation. However, determining appropriate weights for combining the respective received signals, and adaptively changing the weights to accommodate varying interference conditions and signal fading, presents a significant problem.

Typically there are two antennas providing two diversity paths, although there may be more, and typically such a receiver is used at a base station of a mobile cellular communications system, for receiving signals on the so-called reverse or upstream channel, because it can be relatively easy to provide the two or more spaced antennas at the base station. However, the same principles can be applied if desired to the forward channel, and to any time division multiplexed communications path subject to CCI.

It is observed that the desired signal and the CCI need not necessarily have the same characteristics; for example the CCI may, like the desired signal, be a TDMA wireless signal or it may comprise signals of other systems such as AMPS (Advanced Mobile Phone System), AMPS_WD (Wideband Data AMPS), and/or CDPD (Cellular Digital Packet Data) systems.

An object of this invention is to provide an improved method of and apparatus for combining diversity path signals comprising time division multiplexed symbols to reduce co-channel interference.

SUMMARY OF THE INVENTION

According to one aspect, this invention provides a method of combining a plurality of diversity path signals, each signal comprising time division multiplexed symbols in a time slot including one or more known symbols, comprising the steps of, repeatedly in the time slot:

(a) determining from symbols of the diversity path signals, within a window including one or more known symbols, weights for combining the diversity path signals for producing a combined signal having an enhanced SINR (signal to interference plus noise power ratio);

(b) combining symbols of the diversity path signals in accordance with the determined weights to produce the combined signal for one or more symbols adjacent to the window;

(c) demodulating the combined signal to determine said one or more symbols adjacent to the window; and (d) returning to step (a) with the window moved to include one or more of the symbols determined in step (c) as one or more of the known symbols.

Initially the step (a) can comprise using synchronization symbols or CDVCC (coded digital verification colour code) symbols as said one or more known symbols.

Initially, especially where the desired window size is larger than the number of consecutive known symbols, the step (a) can comprise the steps of:

(i) determining from symbols of the diversity path signals, within an initial window including one or more known symbols, weights for combining the diversity path signals for producing the combined signal;

(ii) combining symbols of the diversity path signals in accordance with the determined weights to produce the combined signal for one or more symbols adjacent to the initial window;

(iii) demodulating the combined signal to determine said one or more symbols adjacent to the initial window;

(iv) expanding the window to include one or more of the symbols determined in step (iii); and (iv) determining from symbols of the diversity path signals, within the expanded window, weights for combining the diversity path signals for producing the combined signal.

The step (b) can be performed for adjacent symbols preceding and/or following the window. In particular, the time slot may include symbols, following a first set of known symbols (e.g. synchronization symbols) and preceding a second set of known symbols (e.g. CDVCC symbols), in respect of which the steps (a) to (d) are carried out with initially the step (a) using the first set of known symbols and with step (b) performed for adjacent symbols following the window, and in respect of which the steps (a) to (d) are also carried out with initially the step (a) using the second set of known symbols and with step (b) performed for adjacent symbols preceding the window, to produce two respective determinations of the symbols between the first and second sets of known symbols.

The method can further include the step of monitoring errors of the demodulated symbols and selecting between the two respective determinations of the symbols in dependence upon the monitored errors. The step of monitoring errors can comprise averaging errors over a plurality of symbols.

The window size can be determined to suit particular circumstances, and can typically be about 6 to about 14 symbols. Preferably the number of symbols adjacent to the window for which the diversity path signals are combined in step (b) is less than the window size, and is preferably about half the window size. Desirably the window movement in step (d) is by a number of symbols equal to the number of symbols determined in the preceding step (c).

Another aspect of the invention provides a method of determining weights for diversity path signals to be combined to produce a combined signal for demodulation, the diversity path signals each comprising time division multiplexed symbols in a time slot including known symbols, comprising the steps of defining a window comprising known symbols as a reference signal and, repeatedly in the time slot: determining weights for the diversity path signals from a correlation vector of the reference signal and a correlation matrix of the diversity path signals in the window; combining symbols of the diversity path signals in accordance with the determined weights to produce the combined signal, for symbols adjacent to the window, for demodulation thereby to produce further known symbols; and changing the window to include the further known symbols in the reference signal.

The step of changing the window preferably comprises moving the window through a smaller number of symbols than the size of the window, desirably about half the window size, whereby successive positions of the window overlap one another.

These steps are advantageously carried out with movements of respective windows in opposite directions, from respective sets of initially known symbols, for symbols between the respective sets of initially known symbols, to produce respective sets of combined signal symbols for demodulation, preferably also with the step of monitoring errors of demodulated symbols and selecting between the respective sets in dependence upon the monitored errors.

The invention also provides apparatus for combining and demodulating diversity path signals each comprising time division multiplexed symbols in a time slot including known symbols, the apparatus comprising: buffers for storing symbols of the diversity path signals; a weight calculating unit for determining weights for combining symbols of the diversity path signals from the buffers; a signal combiner arranged to combine symbols of the diversity path signals from the buffers in accordance with the respective weights determined by the weight calculating unit to produce a combined signal; and a demodulator arranged to demodulate symbols of the combined signal to produce demodulated symbols; wherein the weight calculating unit is responsive to the known symbols and the corresponding symbols of the diversity path signals from the buffers to produce initial weights for combining the symbols, and is iteratively responsive to consequently demodulated symbols from the demodulator and to the corresponding symbols of the diversity path signals from the buffers to produce subsequent weights for combining the symbols.

The apparatus preferably includes a quantizing function for quantizing said consequently demodulated symbols from the demodulator for supply to the weight calculating unit for producing said subsequent weights.

The apparatus can also include an error function for determining errors between demodulated symbols supplied from the demodulator to the quantizing function and corresponding symbols output from the quantizing function to the weight calculating unit. Advantageously it also includes buffers for storing, for at least some of the symbols in the time slot, a quantized output of the quantizing function and the determined errors for said symbols from the error function, a similar arrangement for producing and buffering for at least these symbols another quantized output and corresponding determined errors using different known symbols in the time slot, and a decision unit for selecting between the quantized outputs for at least these symbols in dependence upon the corresponding determined errors. All of the functions of the apparatus can be constituted by functions of a digital signal processor.

BRIEF DESCRIPTION OF THE DRAWINGS

The invention will be further understood from the following description with reference to the accompanying drawings, in which.

DESCRIPTION OF THE PREFERRED EMBODIMENTS

Figures 1, 2:
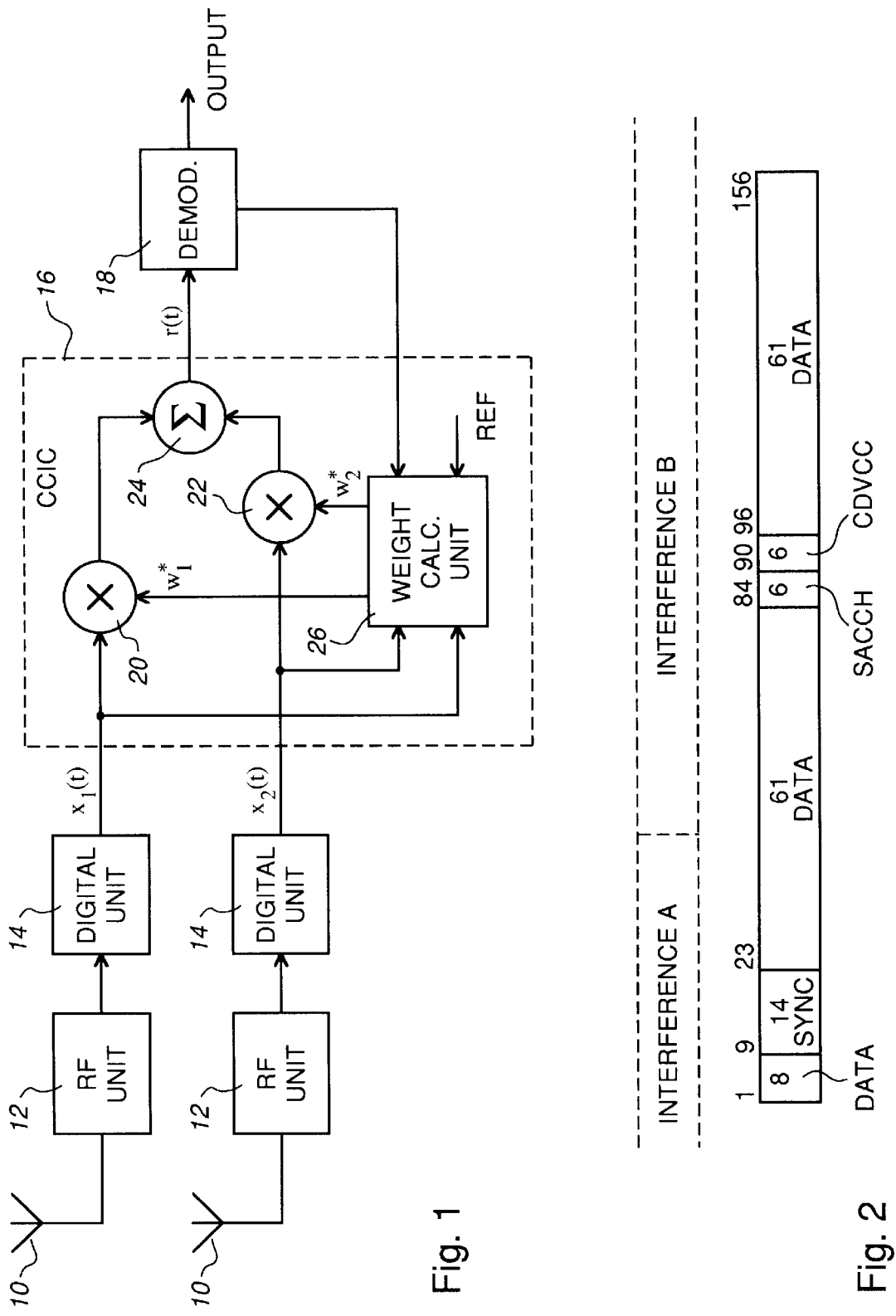
FIG. 1 schematically illustrates a block diagram of pairs of a two-path TDMA cellular radio communications receiver including a co-channel interference canceller (CCIC) in accordance with this invention.
FIG. 2 illustrates a TDMA time slot and relative timing of TDMA co-channel interference.

Referring to FIG. 1, a block diagram illustrates parts of a cellular radio communications receiver having in this case two diversity paths each including a respective antenna 10, RF (radio frequency) front-end unit 12, and digital unit 14 providing a respective one of two digital diversity path sampled signals $x_1(t)$ and $x_2(t)$. Each digital unit 14 for example includes, as is known in the art, a sampler and analog-digital converter, a digital receive filter, and clock recovery and frame synchronization functions, and together with subsequent functions of the receiver can be constituted by functions of one or more digital signal processor (DSP) integrated circuits. The two antennas 10 are physically spaced apart to provide two diversity paths. More than two diversity paths can be provided, and their signals can be combined, in a similar manner, but for clarity and simplicity it is assumed in most of this description that there are only two diversity paths as shown in FIG. 1.

The signals $x_1(t)$ and $x_2(t)$ are weighted and combined in a CCI reducer or canceller (CCIC) 16, shown within a dashed-line box in FIG. 1, to produce an optimum received signal r(t), which is supplied to a demodulator 18 to produce a signal output. The demodulator 18 also supplies a feedback signal to the CCIC 16 for adaptively changing the weightings of the diversity path signals $x_1(t)$ and $x_2(t)$ as is further described below.

The CCIC 16 comprises multipliers 20 and 22, a summing unit 24, and a weight calculation unit 26. The unit 26 is supplied with the signals $x_1(t)$ and $x_2(t)$, the feedback signal from the demodulator 18, and reference signals REF, and serves to produce weights $w^*_1$ and $w^*_2$ as described below, the superscript * representing conjugation. The multipliers 22 and 24 are supplied with the signals $x_1(t)$ and $x_2(t)$ respectively and with the weights $w^*_1$ and $w^*_2$ respectively; products of these signals are supplied to and added by the summing unit 24 to produce the signal r(t).

In the following description it is assumed that the receiver of FIG. 1 is operable in a TDMA cellular radio system compatible with EIA/TIA document IS-54-B: Cellular System Dual-Mode Mobile Station—Base Station Compatibility Standard (Rev. B), referred to here simply as an IS-54 system. As shown in FIG. 2, each time slot of an IS-54 system provides for the communication of 156 symbols comprising, in order, 8 data symbols (symbols 1 to 8 of the time slot), 14 symbols (9 to 22) forming a synchronizing word SYNC, a further 61 data symbols (23 to 83), 6 symbols (84 to 89)) of a slow associated control channel SACCH, 6 symbols (90 to 95) of a coded digital verification colour code CDVCC, and a further 61 data symbols (96 to 156). The SYNC and CDVCC symbols represent information that is known to the receiver and constitute the reference signals REF referred to above.

As is shown by dashed lines in FIG. 2, CCI, for example TDMA interfering signals represented as Interference A and Interference B, can have an arbitrary time relationship to the timing of the desired signal, so that changes in the CCI can take place at arbitrary times within the time slot of the desired signal.

An IS-54 system uses π/4 shifted DQPSK (differential quadrature phase shift keyed) modulation for which the complex baseband representation S(t) of the transmitted signal is given by:

$$S(t) = \sum_{i=-\infty}^{\infty} s_i h_T(t - iT) \quad (1)$$

where t is time, $s_i$ is the complex symbol transmitted during the symbol interval i, $h_T(t)$ is the impulse response of the transmit filter, and T is the symbol interval. The symbol $s_i$ is differentially encoded as $s_i = s_{i-1}(a_i + jb_i)/\sqrt{2}$ where $a_i$ and $b_i$ are each ±1 and represent the information bits of the symbol i, and $s_i$ has any of the values exp $(j\pi k/4)$, k=0, ... 7 with equal probability.

Assuming that fading is not frequency-dependent (equalization can be used to compensate for frequency-dependent fading), then the transmission channel can be represented by a complex multiplicative fading factor of the form U(t)=A(t) exp (jγ(t)) where A(t) and γ(t) are the random amplitude and the random phase, respectively, of the fading factor.

After passing through the transmission channel, the signal received by each of the diversity antennas 10 is filtered by the receive filter in the digital unit 14, the cascade of the transmit and receive filters having a raised-cosine spectral characteristic. Assuming perfect sampling phase information for simplicity, then the signal at the output of the receive filter, and hence at the output of the digital unit 14, for the diversity path n and the symbol interval k and hence at the time t=kT is given by:

$$x_n(kT) = g_n(kT)S_d(kT) + \sum_{j=1}^{L} u_{n,j}(kT)S_j(kT) + \zeta_n(kT) \quad (2)$$

where $g_n(kT)$ and $u_{n,j}(kT)$ are the fading factors affecting respectively the desired signal $S_d(kT)$ and the j-th one of L co-channel interfering signals signal $S_j(kT)$, and $\zeta_n(kT)$ is the filtered complex Gaussian noise with zero mean and valiance $\sigma_n^2$, in the diversity path n.

For the case of two diversity paths, the output of the CCIC 16 is given by:

$$r(kT) = w^*_1(kT)x_1(kT) + w^*_2(kT)x_2(kT) \quad (3)$$

Putting n=1 and n=2 for the two diversity paths in equation (2) and substituting for $x_1(kT)$ and $x_2(kT)$ in equation (3) gives:

$$r(kT) = (w_1^*(kT)g_1(kT) + w_2^*(kT)g_2(kT))s_k + \quad (4)$$

$$\sum_{j=1}^{L}(w_1^*(kT)u_{1,j}(kT) + w_2^*(kT)u_{2,j}(kT))S_j(kT) +$$

$$(w_1^*(kT)\zeta_1(kT) + w_2^*(kT)\zeta_2(kT))$$

Using equation (4), the following expression can be derived for the signal to interference plus noise power ratio (SINR) at the output of the CCIC 16 at the time t=kT:

$$SINR(k) = \frac{|w_1^*(kT)g_1(kT) + w_2^*(kT)g_2(kT)|^2}{\sum_{j=1}^{L}|w_1^*(kT)u_{1,j}(kT) + w_2^*(kT)u_{2,j}(kT)|^2 + P_N} \quad (5)$$

where $P_N$ is the noise power at the output of the CCIC 16 and is given by:

$$P_N = |w_1^*(kT)\zeta_1(kT) + w_2^*(kT)\zeta_2(kT)|^2 \quad (6)$$

For optimum co-channel interference reduction by the CCIC 16 it is necessary to minimize the mean-squared error (MSE) at the output of the demodulator 18, or equivalently to maximize the SINR at the output of the CCIC 16. If the vector X(t) denotes the diversity path signals $x_1(t)$ and $x_2(t)$, i.e. if:

$$X(t) = [x_1(t)x_2(t)]^T \quad (7)$$

where the superscript T denotes transpose, then it can be shown that the set of weights that minimizes the MSE at the output of the demodulator (or maximizes the SIR at the output of the CCIC 16) is given by:

$$W(t) = \begin{bmatrix} w_1(t) \\ w_2(t) \end{bmatrix} = R_{xx}^{-1}(t)r_{xd}(t) \quad (8)$$

where $R_{xx}$ represents the correlation matrix of the received signals and $r_{xd}$ represents the reference signal correlation vector, given by:

$$R_{xx}(t) = E[X(t)X^{*T}(t)] \quad (9)$$

$$r_{xd}(t) = E[X(t)d^*(t)] \quad (10)$$

where E[.] denotes expectation, $X^{*T}(t)$ is the transpose of the complex conjugate of X(t), and d(t) is a reference signal that is correlated with the desired signal. As indicated above, the reference signal is constituted by the SYNC and CDVCC signals. This implies that frame synchronization must first be established, but this is necessary for any kind of diversity combining of signals.

In the practical embodiments of the invention described below, a number of symbols within a limited-size window are used to approximate the correlation matrix and the correlation vector, thereby to determine an optimum set of weights (weight acquisition). Such weights could, if fading of the desired and interfering signals were very slow relative to the duration of the time slot, be used throughout the time slot. In practice this is generally not the case. Consequently, a weight tracking procedure is used after the weight acquisition procedure to maintain an optimum set of weights throughout the time slot; this involves moving the window progressively through the time slot of the desired signal.

The weight acquisition and weight tracking procedures are described below with reference to FIG. 3, which illustrates the first part of a time slot of the desired signal and, below this, illustrations representing a sequence of steps F1, F2, etc. FIG. 4 is a similar illustration of a middle part of a time slot and, below this, representations of another sequence of steps B1, B2, etc.

Figure 3:
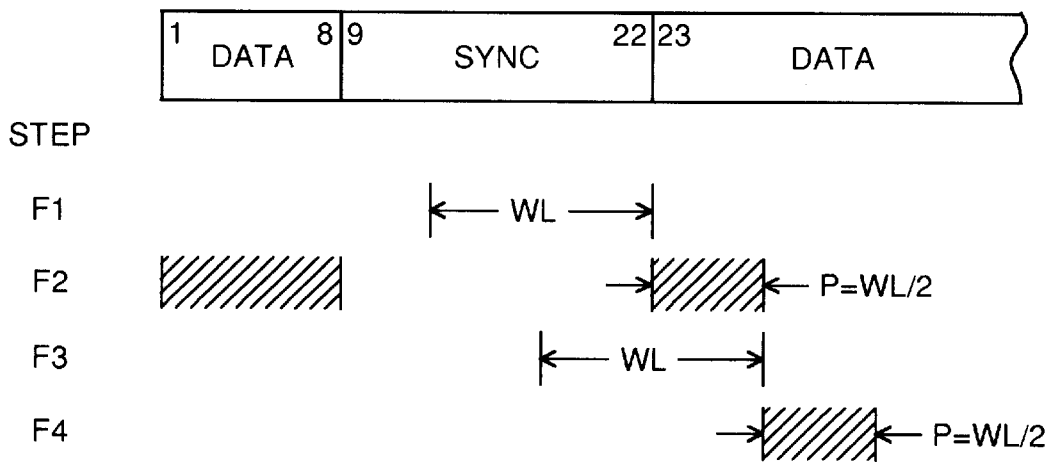
FIGS. 3 and 4 are diagrams with reference to which operation of different forms of the CCIC is explained.
Figure 4:
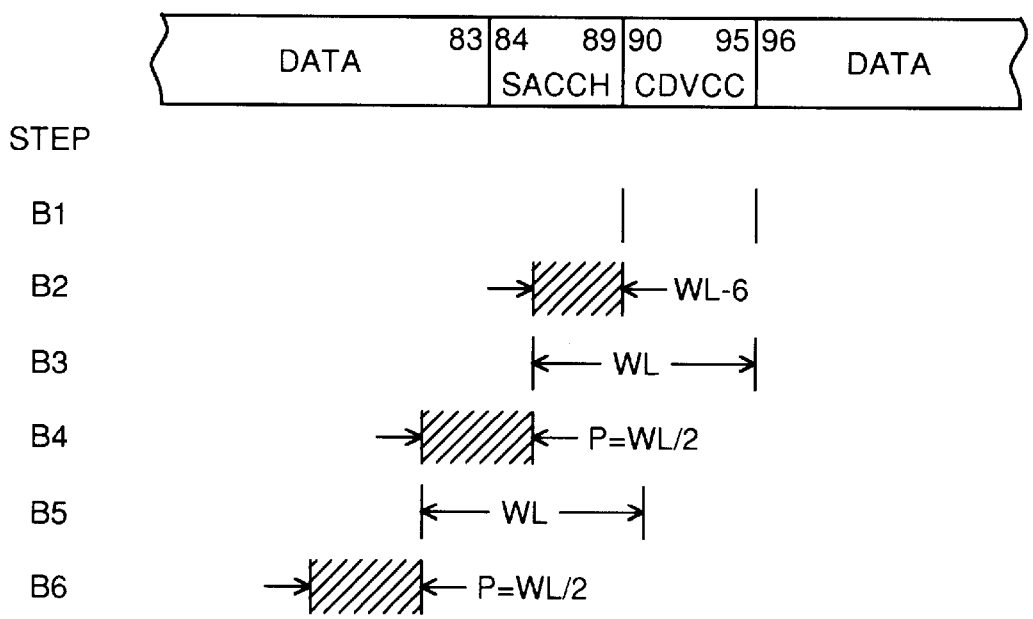

Referring to FIG. 3, in a first step F1 a window of length WL symbols is defined by the last WL≦14 symbols of the known synchronization word SYNC at symbols 9 to 22 of the time slot. A large value of WL is desirable for good statistical averaging as required by equations (9) and (10), and a small value of WL is desirable to avoid channel time fluctuations within the window; the latter may be a predominant factor in fast fading situations. Accordingly, the window size WL is a compromise between these factors. By way of example, the illustrations in FIGS. 3 and 4 correspond to the case of WL=10, but it can be seen that exactly the same principles as described and illustrated here can be applied for other window sizes from 1 to 14 symbols. In addition, it can be appreciated that the technique described below with reference to steps B1 to B3 of FIG. 4 can also be applied if desired to the case of FIG. 3 to create a window size WL that is greater than 14 symbols.

The WL symbol samples in the window are then used to approximate the correlation matrix $R_{xx}$ and the reference signal correlation vector $r_{xd}$. In other words, the correlation matrix is approximated by:

$$R_{xx} = \sum_{k=1}^{WL} X(k)X^{*T}(k) \quad (11)$$

and the reference signal correlation vector is approximated by:

$$r_{xd} = \sum_{k=1}^{WL} X(k)d^*(k) \quad (12)$$

The optimum set of weights W is then determined from the correlation matrix $R_{xx}$ and the reference signal correlation vector $r_{xd}$ in accordance with equation (8). For the case of two diversity paths and hence two weights $w_1$ and $w_2$ described here, direct matrix inversion (DMI) is preferred to determine the weights $w_1$ and $w_2$ because the correlation matrix $R_{xx}$ is a 2 by 2 matrix for which DMI involves very little computation. DMI also has an advantage of better convergence than other known techniques, such as least mean squared (LMS) error estimation of the weights. However, for larger numbers of diversity paths, for example for 4 or more diversity paths, the LMS technique involves less computation than, and may be preferred over, DMI.

Thus step F1 in FIG. 3 comprises determining an initial set of weights from the WL received symbol samples in the window, using the known synchronization word SYNC as a reference signal.

In a second step F2 in FIG. 3, this set of weights is applied in the CCIC 16 to combine the diversity path signal samples $x_1(t)$ and $x_2(t)$ for each of a number P of data symbols immediately following the synchronization word SYNC. Generally P can be any integer, but it is preferably in the range $1 \leq P < WL$ so that there is an overlap between consecutive positions of the window as described further below. P is desirably chosen, as is illustrated in FIG. 3, to be equal to about half the window size, i.e. P=WL/2. The resulting combined symbols r(t) are demodulated by the demodulator 18. Hatching (diagonal lines) is used in FIG. 3 to denote these steps of combining and demodulating the received samples.

As is also illustrated by hatching in FIG. 3, in the step F2 each of the 8 data symbols preceding the synchronization word SYNC is also combined and demodulated using the same initial set of weights determined in the step F1. Alternatively, the steps described below, involving moving the window progressively through the data symbols and recalculating the set of weights, can also be applied backwards from the synchronization word SYNC through these data symbols.

In a third step F3 in FIG. 3, the window is moved forwards (to the right in FIG. 3) by P symbols, and a new set of weights is determined in the same manner as in step F1 using as the reference the symbols in the moved window. These symbols are now known, because they are either part of the synchronization word SYNC or they are provided by the feedback signal to the weight calculation unit 26 of the CCIC 16 from the demodulator 18 as a consequence of the demodulation in the step F2. It can be seen that in the preferred case of $1 \leq P < WL$ the moved window position in the step F3 overlaps the previous position of the window in the step F1. With P being equal to about half the window size as shown in FIG. 3 there is an overlap of about 50%, which can be an optimal choice considering conflicting requirements for accurate weight tracking and minimal computation.

In a fourth step F4 in FIG. 3, again as shown by hatching, the new set of weights is applied in the CCIC 16 to combine the diversity path signal samples $x_1(t)$ and $x_2(t)$ for each of a number P of data symbols immediately following the window, and the resulting combined symbols r(t) are demodulated by the demodulator 18.

These steps F3 and F4 are subsequently repeated in turn, with the window being moved forwards progressively through the time slot, until all of the symbols in the time slot have been demodulated. A difference is made with respect to the CDVCC symbols, in that this is information known to the receiver and accordingly the known information is used to constitute the reference for these symbols rather than the symbols fed back to the CCIC 16 by the demodulator 18.

Correspondingly, the known CDVCC symbols can themselves be used, either alone or preferably in conjunction with the known SYNC symbols as described above, to determine optimum weights for combining the diversity path signals in the rest of the time slot. Thus the procedure described above with reference to FIG. 3 can be applied, using the CDVCC symbols as a reference signal to determine an initial set of weights in the same manner as described above, in the forwards direction for the final 61 data symbols in the time slot and/or backwards for the information preceding the CDVCC symbols in the time slot. The latter (backwards direction) procedure can be particularly advantageous when used in combination with the forwards direction procedure described above with reference to FIG. 3, in that it enables an optimum set of weights to be determined both before and after a change in the interference when this change occurs between the SYNC and CDVCC symbols of the time slot of the desired signal, as is shown in FIG. 2 for the change between Interference A and Interference B.

The backwards direction procedure is described below with reference to FIG. 4. It is similar to the forwards procedure except for the use of the CDVCC symbols as the reference signal, the direction in which the window is moved, and additional steps which arise from the window size WL being greater than the number (6) of known CDVCC symbols. Although for the backwards procedure the window size WL can be restricted to the range $1 \leq WL \leq 6$, it is desirable for computation and statistical averaging purposes to use the same window size for the backwards procedure as for the forwards procedure; for example WL=10 as shown in FIG. 4.

In a first step B1 a window of 6 symbols is aligned with the position of the known CDVCC symbols, the CDVCC symbol samples are used to approximate the correlation matrix $R_{xx}$ and the reference signal correlation vector $r_{xd}$ using equations (11) and (12), and an optimum set of weights W is determined from the correlation matrix $R_{xx}$ and the reference signal correlation vector $r_{xd}$ in accordance with equation (8) in the same manner as described above, for example using DMI.

In a second step B2 in FIG. 4, this set of weights is applied in the CCIC 16 to combine the diversity path signal samples $x_1(t)$ and $x_2(t)$ for each of a number WL-6=4 (in this case) of symbols immediately preceding the CDVCC symbols; as shown these are symbols of the SACCH. As shown by hatching in FIG. 4, the resulting combined symbols r(t) are demodulated by the demodulator 18.

In a third step B3 in FIG. 4, the window is enlarged backwards (to the left in FIG. 4) so that it has the desired size WL, and a new set of weights is determined in the same manner as in step B1 using as the reference both the 6 CDVCC symbols and the WL−6 symbols produced by the demodulator 18 in the step B2.

In a fourth step B4 in FIG. 4, again as shown by hatching, the new set of weights is applied in the CCIC 16 to combine the diversity path signal samples $x_1(t)$ and $x_2(t)$ for each of P symbols immediately preceding the window, and the resulting combined symbols r(t) are demodulated by the demodulator 18.

In a fifth step B5 in FIG. 4, the window is moved backwards (to the left in FIG. 4) by P symbols, and a new set of weights is determined in the same manner as in step B3 using as the reference the now known symbols in the moved window. A sixth step B13 in FIG. 4 repeats the step B4 for the next P symbols in the backwards direction, and these steps B5 and B6 are repeated in turn, with the window being moved backwards progressively through the time slot, at least until the symbols SYNC in the time slot are reached.

It can be seen from the above description that the weight tracking procedure can be provided in either the forwards direction or the backwards direction, or in both directions, through the different parts of the time slot, using either the SYNC symbols or the CDVCC symbols, or preferably both, as reference signals for weight acquisition, and using an arbitrary window size WL and an arbitrary window movement through P symbols. However, as already explained, preferably $1 \leq P < WL$ so that successive window positions overlap, and desirably P is about half of WL so that the overlap is about 50%.

Figure 5:
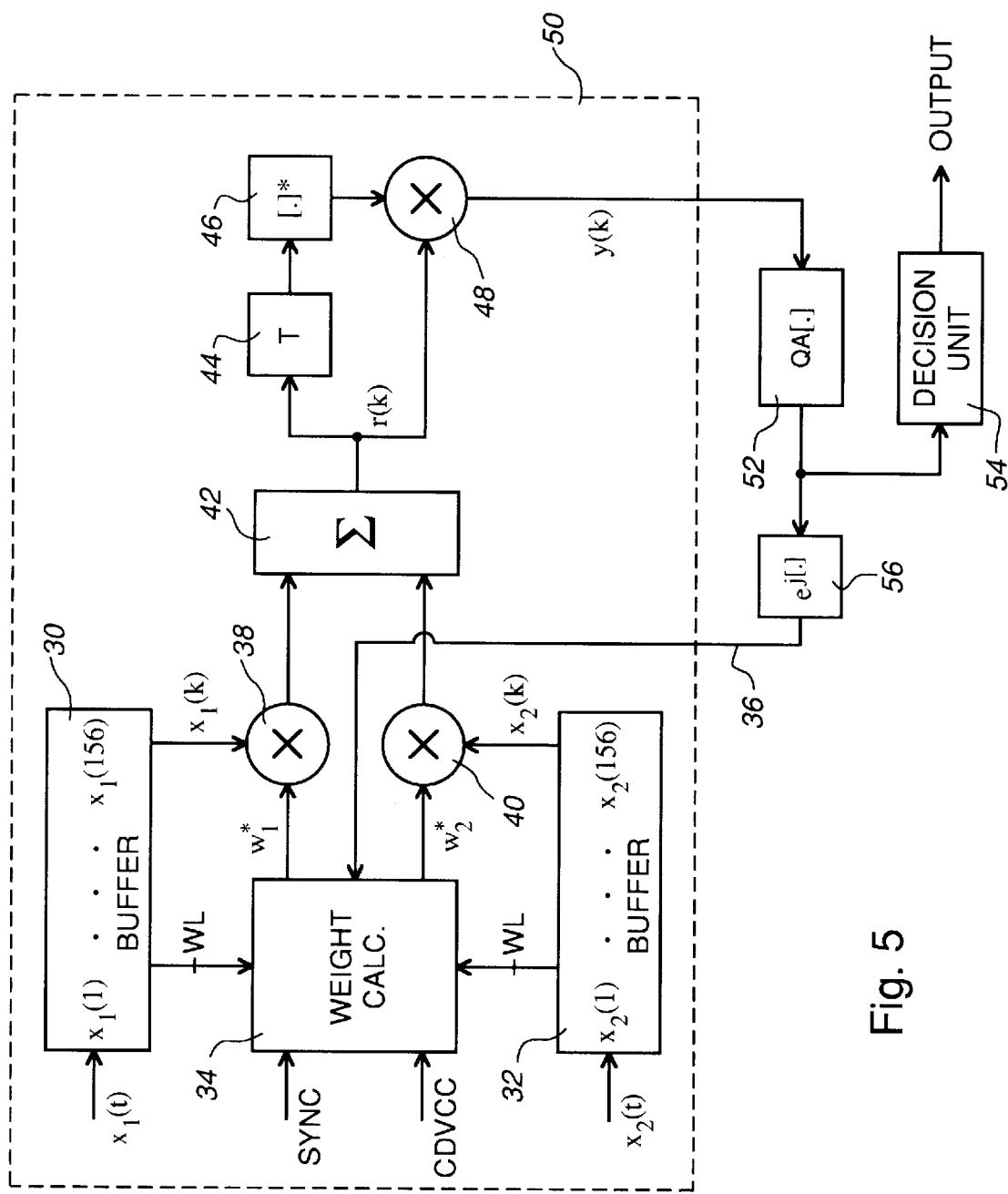
FIGS. 5 and 6 illustrate block diagrams of different forms of the CCIC.

FIG. 5 illustrates, for the case of two diversity paths, an arrangement of functions of the CCIC 16 and demodulator 18 for implementing the forwards direction procedure of FIG. 3. As already mentioned, these functions can be implemented as functions of a DSP integrated circuit.

The arrangement of FIG. 5 comprises a buffer 30 for the symbol-spaced open-eye samples $x_1(1)$ to $x_1(156)$ of one time slot for the diversity path signal $x_1(t)$, and a similar buffer 32 for the corresponding samples $x_2(1)$ to $x_2(156)$ of the other diversity path signal $x_2(t)$. It also comprises a weight calculator 34 which is supplied with WL moving window samples from each of the buffers 30 and 32, the known SYNC and CDVCC symbol information, and demodulated signals from a path 36. For each symbol k, the weight calculator 34 produces the optimum weights $w^*_1$ and $w^*_2$ with which the diversity path symbols $x_1(k)$ and $x_2(k)$ respectively are multiplied in complex signal multipliers 38 and 40 respectively, the products being summed in a complex signal summer 42 to produce the resultant signal r(k). The signal r(k) is differentially demodulated using a one-symbol (T) delay 44, complex conjugation 46, and complex signal multiplier 48 to produce a complex signal, referred to here as a soft decision, y(k). These functions of the arrangement are shown within a dashed-line box 50.

A function 52 is supplied with the soft decision y(k) and maps the phase angle θ of this to a quantized angle in accordance with the Table below. The quantized angle is supplied to a decision unit 54, which produces decoded output dibits a and b as also shown by the Table. In addition, the quantized angle is supplied to an exponential function unit 56 which determines the complex symbol which is associated with the quantized angle, this complex symbol being supplied on the path 36 as the feedback signal from the demodulator to the weight calculator 34.

| Angle of y(k) | Quant. angle | a | b |
|---|---|---|---|
| $0 \leq \theta \leq \pi/2$ | $\pi/4$ | 0 | 0 |
| $\pi/2 < \theta \leq \pi$ | $3\pi/4$ | 0 | 1 |
| $\pi \leq \theta \leq 3\pi/2$ | $-3\pi/4$ | 1 | 1 |
| $3\pi/2 < \theta \leq 2\pi$ | $-\pi/4$ | 1 | 0 |

Figure 6:
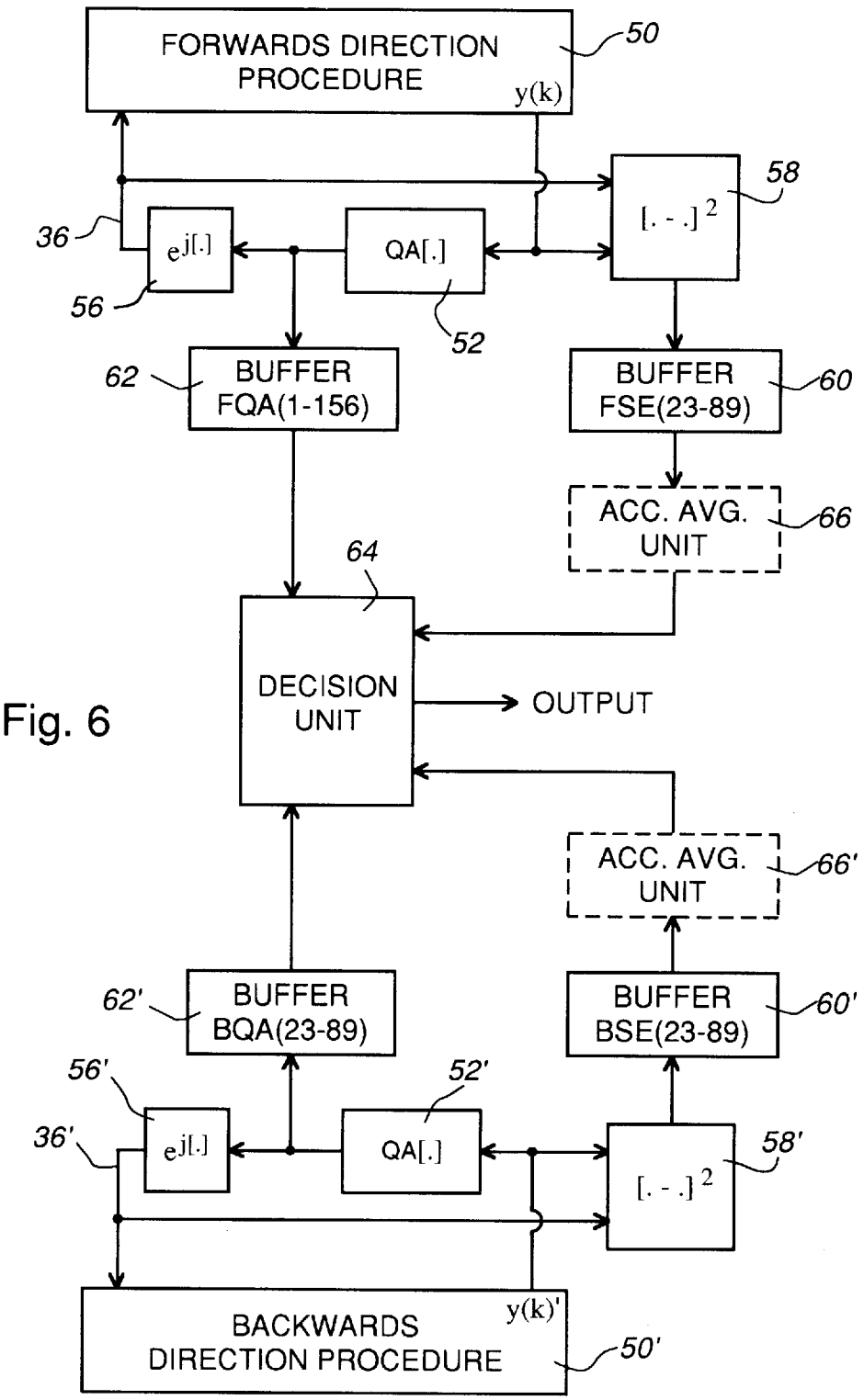

FIG. 6 illustrates another arrangement of functions of the CCIC 16 and demnodulator 18 for implementing a combination of the forwards direction procedure of FIG. 3 and the backwards direction procedure of FIG. 4. A first form of the arrangement is shown in solid lines in FIG. 6 and is described initially below, and a modification is shown by broken lines and is described subsequently below. Again the functions of the arrangements can be implemented as functions of a DSP integrated circuit.

The arrangement of FIG. 6 includes a forwards direction procedure block 50 which is the same as described above with reference to FIG. 5, which produces the soft decision y(k) for each symbol, the function 52 which maps the phase angle θ of y(k) to a quantized angle, and the exponential function unit 56 which determines the complex symbol associated with the quantized angle and supplies it on the path 36 as the feedback signal to the weight calculator in the block 50. The arrangement further includes, for the forwards direction procedure, a squared error (SE) function 58 and buffers 60 and 62. The buffer 62 is supplied with the quantized angles from the function 52 for all of the symbols 1 to 156 in the time slot and stores these as forwards quantized angle signals FQA. The SE function 58 is supplied, for each of the symbols 23 to 89 in the time slot, with the soft decision y(k) from the block 50 and the feedback complex signal from the path 36 and determines the SE between them (i.e. the square of their difference). The buffer 60 is supplied with these SEs and stores them as forwards SE signals FSE.

The arrangement of FIG. 6 also includes a substantially similar arrangement for the backwards direction procedure as described above with reference to FIG. 4. In FIG. 6, the functions for the backwards direction procedure are given the same reference numbers, supplemented by a prime ', as the corresponding functions described above for the forwards direction procedure. Thus substantially the same description as is given above applies for the backwards direction procedure, and accordingly only the differences need be mentioned here. These differences include those described above with reference to FIG. 4 with respect to the steps B1 to B6, including the use of the CDVCC symbols as the reference signal, the expansion of the window to the desired size WL, and the movement of the window backwards progressively from the CDVCC symbols until it reaches the SYNC symbols, i.e. through the symbols 23 to 95 in the time slot.

The backwards direction procedure in this arrangement provides useful information, beyond that provided by the forwards direction procedure, only for the symbols (data and SACCH) 23 to 89 in the time slot. Accordingly, the function 58' determines the SE between the soft decisions y(k)' from the block 50' and the feedback complex signals from the path 36' only for these symbols 23 to 89, and correspondingly the buffer 60' stores the SEs as backwards SE signals BSE, and the buffer 62' stores the quantized angles from the function 52 as backwards quantized angle signals BQA, only for the symbols 23 to 89 in the time slot. It can be appreciated that the buffers 30 and 32 in the block 50 can also serve as the corresponding buffers of the block 50'.

The arrangement of FIG. 6 further comprises a decision unit 64 which is supplied with the contents of the buffers 60, 62, 60', and 62' and produces decoded output dibits in a similar manner to that described above for the decision unit 54 in the arrangement of FIG. 5. For each of the symbols 23 to 89, the decision unit 64 compares the signal FSE from the buffer 60 with the signal BSE from the buffer 60' and, if the former is less than the latter, uses the signal FQA of the respective symbol from the buffer 62 to produce its output. If the signal FSE from the buffer 60 is not less than the signal BSE from the buffer 60', then the decision unit 64 uses the signal BQA of the respective symbol from the buffer 62' to produce its output. For the symbols before the symbol 23 and after the symbol 89, the decision unit 64 uses the signal FQA of the respective symbol from the buffer 62 to produce its output.

The arrangement of FIG. 6 provides the advantage that, in the event of a change in interference from Interference A to Interference B between the symbols 22 and 90 of the time slot as discussed above and illustrated in FIG. 2, with a consequent sudden increase in the signal FSE for the symbols immediately after this change, the decisions made for such symbols are based on the backwards direction procedure having a smaller signal BSE and hence are much more reliable. For uncorrelated TDMA interfering signals the probability of such an event is of the order of 50%, so that this is a significant advantage resulting in considerable improvement in the operation of the diversity combining arrangement.

The first form of the arrangement of FIG. 6 as described above uses a comparison of instantaneous values of squared error signals for each of the symbols 23 to 89 in the time slot. Alternatively, any desired averaging scheme can be used, and averages of the squared error signals can be compared, for the same purpose of determining which buffer, 62 or 62', to use to provide the quantized angle for the respective symbol. Broken lines in FIG. 6 illustrate one modification of the arrangement to this end.

In this modification, additional accumulated averaging units 66 for the forwards direction procedure and 66' for the backwards direction procedure are provided between the outputs of the buffers 60 and 60' and the decision unit 64. Each of the units 66 and 66' determines and stores, for each of the symbols 23 to 89 of the time slot, an accumulated average of the respective squared errors up to the respective symbol in the respective direction through the time slot. Thus for each symbol number SN, where $23 \leq SN \leq 89$, the forwards direction procedure accumulated averaging unit 66 determines and stores averages FA(SN) given by:

$$FA(SN) = \frac{1}{(SN-22)} \sum_{i=23}^{SN} FSE(i) \quad (13)$$

where FSE(i) is the signal stored in the buffer 60 for the symbol i, and the backwards direction procedure accumulated averaging unit 66' determines and stores averages BA(SN) given by:

$$BA(SN) = \frac{1}{(90-SN)} \sum_{i=SN}^{89} FSE(i) \quad (14)$$

where BSE(i) is the signal stored in the buffer 60' for the symbol i. The decision unit 64 in this case makes its choice of which buffer, 62 or 62', to use to provide the quantized angle for each of the symbols 23 to 89 based on the lesser of the averages FA(SN) and BA(SN), instead of this choice being based on the lesser of the signals FSE and BSE as described above.

Simulations of the procedures described above have shown, for a variety of conditions, a substantial improvement in co-channel interference reduction compared with maximal ratio combining of the diversity path signals, in which the diversity path signals are weighted in accordance with their signal to noise ratios, aligned in phase, and summed. Depending upon the conditions, such improvement has generally been found to be better for the arrangement of FIG. 6 than for the arrangement of FIG. 5, and better still for the arrangement using accumulated averaging in the modification of FIG. 6.

Although the specific arrangements described above relate to only two diversity paths, it can be seen that the same arrangements can be easily extended for a greater number of diversity paths. In general, L co-channel interfering signals can be cancelled or reduced by a diversity arrangement having L+1 diversity paths.

Numerous other modifications, variations, and adaptations may be made to the described embodiments without departing from the scope of the invention as defined in the claims.

What is claimed is:

1. A method of combining a plurality of diversity path signals, each signal comprising time division multiplexed symbols in a time slot including one or more known symbols, comprising the steps of, repeatedly in the time slot:
   (a) determining from symbols of the diversity path signals, within a window including one or more known symbols, weights for combining the diversity path signals for producing a combined signal having an enhanced SINR (signal to interference plus noise power ratio);
   (b) combining symbols of the diversity path signals in accordance with the determined weights to produce the combined signal for one or more symbols adjacent to the window;
   (c) demodulating the combined signal to determine said one or more symbols adjacent to the window; and
   (d) returning to step (a) with the window moved to include one or more of the symbols determined in step (c) as one or more of the known symbols.

2. A method as claimed in claim 1 wherein initially the step (a) comprises using synchronization symbols as said one or more known symbols.

3. A method as claimed in claim 1 wherein initially the step (a) comprises using CDVCC (coded digital verification colour code) symbols as said one or more known symbols.

4. A method as claimed in claim 1 wherein initially the step (a) comprises the steps of:
   (i) determining from symbols of the diversity path signals, within an initial window including one or more known symbols, weights for combining the diversity path signals for producing the combined signal;
   (ii) combining symbols of the diversity path signals in accordance with the determined weights to produce the combined signal for one or more symbols adjacent to the initial window;
   (iii) demodulating the combined signal to determine said one or more symbols adjacent to the initial window;
   (iv) expanding the window to include one or more of the symbols determined in step (iii); and
   (iv) determining from symbols of the diversity path signals, within the expanded window, weights for combining the diversity path signals for producing the combined signal.

5. A method as claimed in claim 1 wherein step (b) is performed for adjacent symbols preceding the window.

6. A method as claimed in claim 1 wherein step (b) is performed for adjacent symbols following the window.

7. A method as claimed in claim 1 wherein the time slot includes symbols, following a first set of known symbols and preceding a second set of known symbols, in respect of which the steps (a) to (d) are carried out with initially the step (a) using the first set of known symbols and with step (b) performed for adjacent symbols following the window, and in respect of which the steps (a) to (d) are also carried out with initially the step (a) using the second set of known symbols and with step (b) performed for adjacent symbols preceding the window, to produce two respective determinations of the symbols between the first and second sets of known symbols.

8. A method as claimed in claim 7 and further including the step of monitoring errors of the demodulated symbols and selecting between the two respective determinations of the symbols in dependence upon the monitored errors.

9. A method as claimed in claim 8 wherein the step of monitoring errors comprises averaging errors over a plurality of symbols.

10. A method as claimed in claim 1 wherein the window size is about 6 to about 14 symbols.

11. A method as claimed in claim 1 wherein the window size is about
10symbols.

12. A method as claimed in claim 1 wherein the number of symbols adjacent to the window for which the diversity path signals are combined in step (b) is less than the window size.

13. A method as claimed in claim 12 wherein the number of symbols adjacent to the window for which the diversity path signals are combined in step (b) is about half the window size.

14. A method as claimed in claim 1 wherein the window movement in step (d) is by a number of symbols equal to the number of symbols determined in the preceding step (c).

15. A method as claimed in claim 1 wherein there are two diversity path signals.

16. Apparatus for combining and demodulating diversity path signals each comprising time division multiplexed symbols in a time slot including known symbols, the apparatus comprising:

buffers for storing symbols of the diversity path signals;

a weight calculating unit for determining weights for combining symbols of the diversity path signals from the buffers;

a signal combiner arranged to combine symbols of the diversity path signals from the buffers in accordance with the respective weights determined by the weight calculating unit to produce a combined signal; and a demodulator arranged to demodulate symbols of the combined signal to produce demodulated symbols;

wherein the weight calculating unit is responsive to the known symbols and the corresponding symbols of the diversity path signals from the buffers within a window to produce initial weights for combining symbols adjacent to the window, and is iteratively responsive to consequently demodulated symbols from the demodulator and to the corresponding symbols of the diversity path signals from the buffers with the window moved to produce subsequent weights for combining the symbols.

17. Apparatus as claimed in claim 16 and including a quantizing function for quantizing said consequently demodulated symbols from the demodulator for supply to the weight calculating unit for producing said subsequent weights.

18. Apparatus as claimed in claim 17 and including an error function for determining errors between demodulated symbols supplied from the demodulator to the quantizing function and corresponding symbols output from the quantizing function to the weight calculating unit.

19. Apparatus as claimed in claim 18 and including buffers for storing, for at least some of the symbols in the time slot, a quantized output of the quantizing function and the determined errors for said symbols from the error function, a similar arrangement for producing and buffering for at least these symbols another quantized output and corresponding determined errors using different known symbols in the time slot, and a decision unit for selecting between the quantized outputs for at least these symbols in dependence upon the corresponding determined errors.

20. Apparatus as claimed in claim 19 and including averaging functions for averaging the determined errors buffered in the buffers.

21. Apparatus as claimed in claim 16 wherein the functions of the apparatus are constituted by functions of a digital signal processor.

22. A method as claimed in claim 1 wherein the weights for combining the diversity path signals are determined form a correlation vector of the known symbols and a correlation matrix of the diversity path signals in the window.

23. A method as claimed in claim 4 wherein the weights for combining the diversity path signals are determined form a correlation vector of the known symbols and a correlation matrix of the diversity path signals in the window.

24. A method as claimed in claim 7 wherein the weights for combining the diversity path signals are determined form a correlation vector of the known symbols and a correlation matrix of the diversity path signals in the window.

25. A method as claimed in claim 8 wherein the weights for combining the diversity path signals are determined form a correlation vector of the known symbols and a correlation matrix of the diversity path signals in the window.

26. A method as claimed in claim 9 wherein the weights for combining the diversity path signals are determined form a correlation vector of the known symbols and a correlation matrix of the diversity path signals in the window.

27. A method as claimed in claim 13 wherein the weights for combining the diversity path signals are determined form a correlation vector of the known symbols and a correlation matrix of the diversity path signals in the window.

* * * * *